RECEPTION OF SIGNALS TRANSMITTED IN A REVERBERANT ENVIRONMENT
Filed Aug. 1, 1966
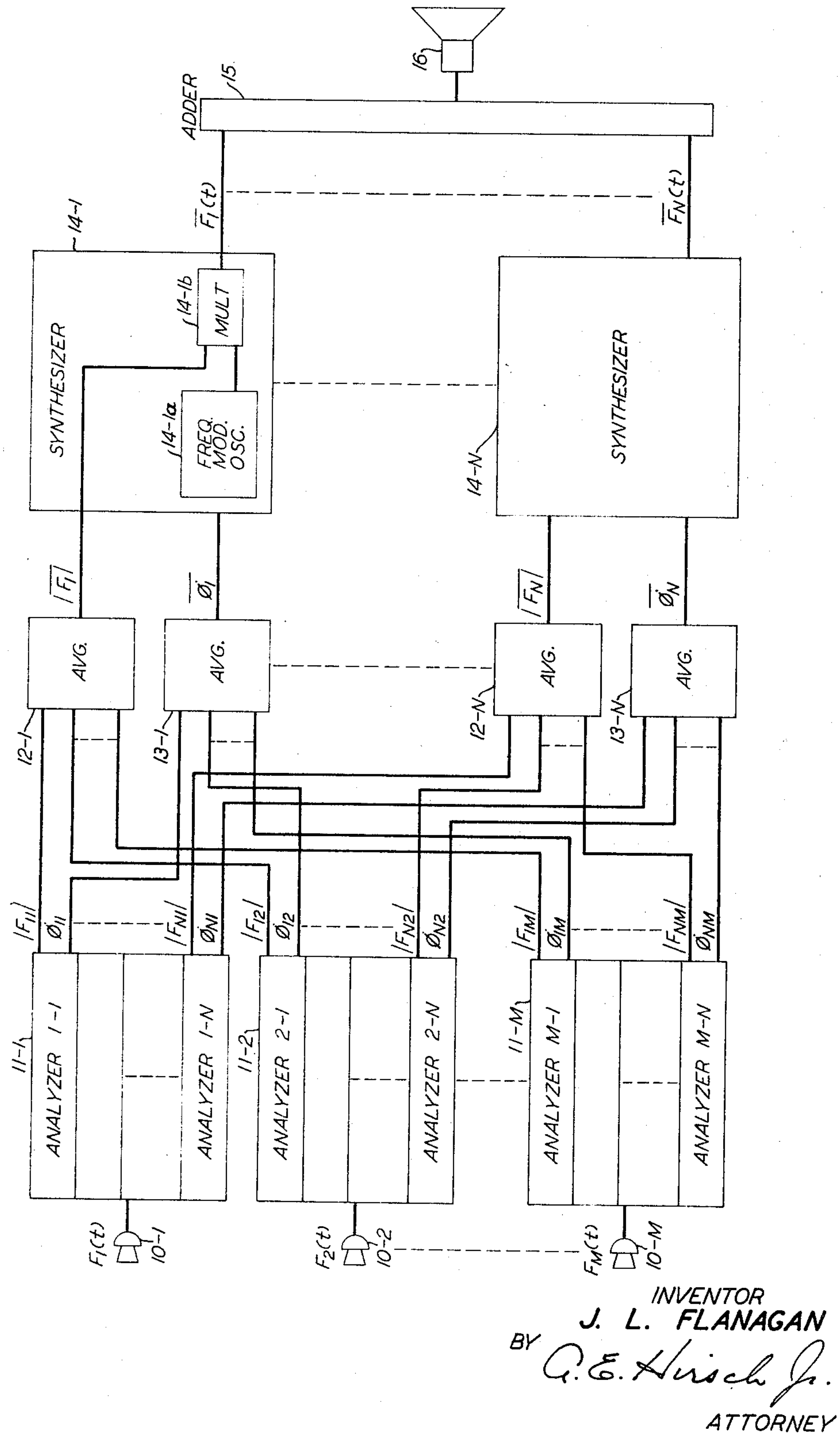
INVENTOR
J. L. FLANAGAN
BY Q. E. Hirsch Jr.
ATTORNEY United States Patent Office 3,440,350
Patented Apr. 22, 1969

3,440,350
RECEPTION OF SIGNALS TRANSMITTED IN A REVERBERANT ENVIRONMENT

James L. Flanagan, Warren Township, Somerset County, N.J., assignor to Bell Telephone Laboratories, Incorporated, Murray Hill, N.J., a corporation of New York Filed Aug. 1, 1966, Ser. No. 569,292
Int. Cl. H04r 3/02
U.S. Cl. 179—1 8 Claims

ABSTRACT OF THE DISCLOSURE

To correct distortions introduced by reverberation, multiple microphones spaced from one another are used to receive sound. Phase coherence is attained by the use of phase-vocoders, the outputs of which are averaged and then combined.

This invention pertains to the distortionless reception of transmitted signals and, more particularly, to the reception of signals transmitted in a reverberant or multipath environment.

There are many known environments, for example, a reverberant enclosure, wherein a signal radiated at one fixed location will traverse a plurality of different paths before impinging upon a receiver located at another fixed location. A hypothetical listener situated at such a receiver location will hear a variety of delayed replicas of the transmitted signal. The overall effect of the superposition of the variously delayed signals is to introduce component cancellation and spectral distortion. Communication may, therefore, be seriously impaired.

One proposal to overcome these disadvantages involves the use of two or more spatially separate microphones. The output signals of these transducers are directly combined to develop a resultant composite signal. However, direct combination of the variously delayed signals, received at spatially distinct positions, compounds phase differences rather than alleviating them; thus, spectral distortion is generally increased. If, however, the microphone outputs could be combined with coherent phase, the distortion introduced by the traversal of a multiplicity of paths would be eliminated.

In accordance with the objects and features of the present invention, signals received after passage through a multipath environment are selectively processed to develop a relatively distortionless replica of the transmitted signal. More particularly, phase coherence is accomplished by selectively utilizing the principles of the phase vocoder. The phase vocoder, shown and described in my copending application Ser. No. 365,587, filed May 7, 1964, now Patent No. 3,360,610, is a communication arrangement in which speech is encoded in terms of a number of points on the short-time speech amplitude spectrum as well as an equal number of points on the time derivative of the short-time speech phase spectrum. At each of a plurality of predetermined frequencies which span the frequency range of an incoming speech signal, there is obtained a pair of signals respectively representative of the real and imaginary parts of the short-time Fourier transform of the original speech signal. From each pair of signals, representing the real and imaginary parts of the short-time Fourier transform at a predetermined frequency, there is developed a pair of narrow band signals, one representing the magnitude of the short-time Fourier transform, and the other representing the time derivative of the phase angle of the short-time Fourier transform. A replica of the original transmitted signal is reproduced, from these control signals, by generating a plurality of cosine waves having the same predetermined frequencies at which the short-time Fourier transform was evaluated.

Each cosine wave is modulated in amplitude and phase angle by one of the pairs of narrow band signals.

In the present invention it is recognized that component cancellation and spectral distortion arise from the inherent phase differences present in the signals received at spatially distinct locations in a reverberant environment. Accordingly, as more fully explained hereinafter, the control signals developed by a plurality of phase vocoder analyzers each individually responsive to a plurality of microphones at spatially distinct positions, are averaged together to develop a plurality of composite amplitude and phase spectra control signals. These composite control signals are utilized to synthesize a replica of the transmitted signal. The synthesizing process requires that the time derivative of the short-time phase spectrum be integrated over time. Generally this integration is accomplished from a predetermined zero-time reference up to the present-time value of the phase derivative signal. The integration, therefore, reproduces the original short-time phase to within an additive constant of integration. By the practice of this invention, the elimination of this additive constant, which is generally different for each spatially separate location and includes any phase variations introduced by the traversal of a diversity of signal paths, permits cohering the composite signals. Thus, spectral distortion and component cancellation are alleviated.

This invention may be more fully understood from the following detailed description of an illustrative embodiment thereof taken in connection with the appended drawing in which the single figure is a block diagram showing signal receiving apparatus embodying the principles of this invention.

*Theoretical considerations*

As established in Equations 9 and 11*b*, on pages 6 and 7, respectively, of my aforementioned copending application, a signal $f(t)$ may be represented in terms of N values each of the short-time amplitude and phase derivative spectra. That is $$f(t)=\sum_{n=1}^{N}|F_n|\cos\left(\omega_n t+\int_0^t \dot{\varphi}_n dt+\Phi_n\right) \quad (1)$$

where $|F_n|$ and $\varphi_n$ are values of the short-time amplitude and phase spectra, respectively, evaluated at the frequency $\omega_n$, $\Phi_n$ is a constant of integration equal to the value of the short-time phase at time equal zero, and the dot above $\varphi_n$ indicates differentiation with respect to time.

If the signal, $f(t)$, is transmitted to M spatially distinct locations, each having K different nondispersive paths by which signals may arrive, the signal received at the *m*th location is the superposition of K variosuly delayed and attenuated versions of the original signal; that is, $$f_m(t)=\sum_{k=1}^{K}a_{km}f(t-\Delta_{km}),\ m=1, 2, \ldots M \quad (2)$$

The terms $a_{km}$ and $\Delta_{km}$ identify, respectively, the attenuation and delay of the transmitted signals. According to Equation 1, each of these M signals may be represented as:

$$f_m(t)=\sum_{n=1}^{N}|F_{nm}|\cos\left(\omega_n t+\int_0^t \dot{\varphi}_{nm} dt+\Phi_{nm}\right) \quad (3)$$

where the subscript *nm* identifies a term evaluated at a frequency $\omega_n$, at spatial location *m*. Owing to the distortion of the K paths, $|F_{nm}|$, $\varphi_{nm}$ and $\Phi_{nm}$ will, in general, differ from $|F_n|$, $\varphi_n$ and $\Phi_n$. Also, each of the M signals will differ from every other of the signals, in accordance with the differences in their respective K multipaths.

By the practice of this invention the M distorted signals are combined to obtain a precise representation of the spectrum of the original transmitted singal. The combination of the $n$th corresponding factors of the M signals, to arrive at a precise representation of the original signal is accomplished by averaging over m, the values of $|F_{nm}|$ and $\dot{\varphi}_{nm}$, and then synthesizing a coherent composite signal in which all the phase terms, $\Phi_{nm}$, have been set equal to zero. Averaging over the constant phase terms, $\Phi_{nm}$, is to be avoided since coherent combination of the signals can be accomplished only if these constant phase values are set equal to zero. Retaining the constant phase values, or averages of them, retains the same kind of distortion as introduced by the multipaths. The definite integration is therefore carried out to eliminate the constant phase values.

In accordance with the principles of this invention, the phase constant, $\Phi_n$, of Equation 1, which is generally different for each of the M spatially separate locations, is eliminated in the synthesis process. Thus, component cancellation and spectral distortion, caused by phase differences, is removed. Accordingly, the amplitude and phase derivative spectra, $|F_n|$ and $\dot{\varphi}_n$, may be averaged together and utilized to form a replica of the transmitted signal in accordance with the following equation:

$$f(t)=\sum_{n=1}^{N}|\overline{F_n}|\cos\left(\omega_n t+\int_0^t\overline{\dot{\varphi}_n}dt\right) \qquad (4)$$

In Equation 4 $|\overline{F_n}|$ is the $n$th value of the composite amplitude spectrum and is equal to $$|\overline{F_n}|=\frac{1}{m}\sum_{m=1}^{M}|F_{nm}| \qquad (5)$$

where $|F_{nm}|$ is the short-time amplitude spectrum of the signal, received at a location $m$, evaluated at a frequency $\omega_n$. Analogously, $\overline{\dot{\varphi}_n}$ is the composite derivative phase signal and is equal to $$\overline{\dot{\varphi}_n}=\frac{1}{m}\sum_{m=1}^{M}\dot{\varphi}_{nm} \qquad (6)$$

where $\dot{\varphi}_{nm}$ is the derivative of the short-time phase spectrum of the received signal, at a location $m$, evaluated at a frequency $\omega_n$.

Thus, in accordance with the principles of this invention, the output signals of $m$ transducers are individually analyzed to produce the quantities $|F_{nm}|$ and $\dot{\varphi}_{nm}$ and these quantities are averaged together to form composite amplitude and phase spectra, respectively, $|\overline{F_n}|$ and $\dot{\varphi}_n$ in accordance with Equations 5 and 6.

*Apparatus*

In the drawing, a transmitted signal, $f(t)$, is received at a plurality of spatially distinct transducers, 10–1 through 10–M, which may be conventional microphones of any desired variety. The signals at the various transducers are typically delayed and attenuated by different amounts as indicated previously in Equation 2. These amounts are dependent upon the characteristics of the multipaths from transmitter to each receiver. In a typical reverberant room, the interpath time differences would be nominally on the ord of 20 milliseconds, more or less.

The output signals of transducers 10 are applied in parallel to M phase vocoder transmitter stations or terminals, 11–1 through 11–M. Each phase vocoder terminal is preferably of the type described in my copending application, referred to above, and comprises a plurality of analyzers, for example, 1–1 through 1–N. As described in that application, a signal, $|F_n|$, representative of the magnitude of the short-time amplitude spectrum, at a predetermined frequency $\omega_n$, is developed at the output of each analyzer. Similarly, a signal, $\dot{\varphi}_n$, representative of the time derivative of the short-time phase spectrum, at a predetermined frequency $\omega_n$, is developed by the same analyzer. Simultaneously, each of the other analyzers of phase vocoder terminal 11–1 produces a pair of relatively narrow band control signals, representative of a selected point on the amplitude spectrum and a selected point on the time derivative of the phase spectrum of the received signal. As shown in the drawing, the plurality of phase vocoder terminals 11–2 through 11–M, also develop N pairs of control signals at the designated frequencies $\omega_1$ through $\omega_N$. For example, the pair of signals developed by phase vocoder terminal 11–M, representative of the amplitude and derivative phase signal of the received signal at a frequency $\omega_n$, are identified respectively as $|F_{nM}|$ and $\dot{\varphi}_{nM}$. The N pairs of control signals developed by each phase vocoder terminal 11–1 through 11–M thus represent in coded form the information content of the received signals.

All of the control signals representative of the short-time amplitude spectrum of the received signals at a predetermined frequency are averaged together to form a composite amplitude control signal at that frequency. Thus, for example, control signals $|F_{11}|$ through $|F_{1M}|$ are processed by network 12–1 to form a composite amplitude control signal, $|\overline{F_1}|$, representative of the composite short-time amplitude spectrum of the received signals at a frequency $\omega_1$. Likewise, all of the control signals representative of the derivative of the short-time phase spectrum of the received signals, at a predetermined frequency, are averaged together to form a composite phase derivative control signal at that frequency. Thus, phase derivative control signals, $\dot{\varphi}_{11}$ through $\dot{\varphi}_{1M}$, are averaged together in network 13–1 to form a composite control signal, $\overline{\dot{\varphi}_1}$, representative of the composite short-time phase derivative spectrum of the received signals at a frequency $\omega_1$. Networks 12 and 13 may be of any conventional and well-known type. As indicated in the drawing, the respective control signals, at a predetermined frequency $\omega_n$, are averaged together so that a plurality of composite pairs of control signals, $|\overline{F_1}|$ through $|\overline{F_N}|$ and $\overline{\dot{\varphi}_1}$ through $\overline{\dot{\varphi}_N}$, are produced in accordance with Equations 5 and 6. The N pairs of control signals developed by networks 12 and 13 thus represent in coded form the composite information content of the received signals.

Each pair of composite control signals is applied, via any desired communication channel, to a corresponding synthesizer 14–1 through 14–N. Within synthesizer 14–1, for example, which may be of the type described in my aforementioned application, the composite phase derivative phase signal, $\overline{\dot{\varphi}_1}$, is applied to a frequency modulated oscillator **14–1*a*. Oscillator 14–1*a*** may be of any conventional design for producing a cosine wave at the fixed frequency $\omega_1$, which wave is modulated by the incoming phase derivative control signal to produce an output cosine wave having an argument $$\left(\omega_1 t+\int_0^t\overline{\dot{\varphi}_1}dt\right)$$

in accordance with Equation 4. It should be noted that no attempt is made to preserve the constant of integration. A suitable oscillator is described in F. Terman, Radio Engineering, pages 493–499 (3rd ed., 1947). This frequency-modulated cosine wave is applied to a multiplier, **14–1*b*, where it is multiplied together with the incoming composite magnitude control signal, $|\overline{F_1}|$, thereby developing a product output signal proportional to the first term, $f_1(t)$, of Equation 4. Correspondingly, the other synthesizers, for example, 14–N, develop at their output terminals product signals proportional to the other terms of Equation 4. These product signals are then additively combined by connecting the output terminals of synthesizers 14–1 through 14–N in parallel to the input terminal of adder 15. Adder 15 develops a sum signal that is a replica of the original transmitted signal as specified by Equation 4. Reproducer 16**, which may be of any desired construction, converts the replica signal into audible sound if so desired.

Thus, by the application of this invention, a replica of the original transmitted signal is developed free of component cancellation and spectral amplitude distortion.

It is to be understood that the above-described arrangement is merely illustrative of the numerous arrangements which may be devised from the principles of this invention by those skilled in the art without departing from the spirit and scope of the invention. For example, if desired, the definition of a composite amplitude signal may be in terms of log amplitudes rather than linear amplitudes.

What is claimed is:

1. Apparatus for receiving signals transmitted in a reverberant environment comprising:
   means for detecting said signals,
   means responsive to said detecting means for developing a plurality of pairs of signals representative of the short-time amplitude and phase spectra of said detected signals,
   means for developing a plurality of pairs of composite control signals from said representative signals,
   means for developing a plurality of sinusoidal waves having amplitude and phase components respectively determined by said composite control signals,
   and means for combining said sinusoidal waves to develop a replica of said transmitted signals.

2. Apparatus as defined in claim 1 wherein said means for detecting said transmitted signals comprises a plurality of transducers situated at spatially distinct positions.

3. Apparatus as defined in claim 1 wherein said means responsive to said detecting means comprises a plurality of phase vocoder transmitter terminals.

4. Apparatus as defined in claim 3 wherein each of said phase vocoder terminals comprises a plurality of analyzers for developing pairs of signals representative of the short-time amplitude spectrum and the short-time derivative phase spectrum of said detected signals at a plurality of predetermined frequencies.

5. Apparatus as defined in claim 1 wherein said means for developing composite control signals comprises a plurality of averaging networks.

6. Apparatus as defined in claim 1 wherein said means for developing a plurality of sinusoidal waves comprises a plurality of synthesizing means each supplied with one of said pairs of composite control signals for generating a sinusoidal wave at a predetermined frequency having a magnitude and phase angle determined by said composite control signals.

7. Apparatus as defined in claim 1 wherein said combining means comprises means for algebraically combining said sinusoidal waves.

8. Apparatus for receiving signals transmitted in a multipath environment comprising:
   a plurality of transducers situated at spatially distinct positions for detecting said transmitted signals,
   a plurality of analyzers connected to each of said transducers for deriving from said detected signals a plurality of pairs of magnitude and phase control signals representative of the short-time amplitude spectra and short-time phase spectra of said detected signals at a plurality of predetermined frequencies,
   means for developing signals corresponding to the average of said control signals at each of said plurality of predetermined frequencies,
   a plurality of synthesizers each supplied with one of said pairs of average control signals for generating a wave having a magnitude and phase angle respectively determined by said pair of control signals,
   and adding means for combining said signals generated by each of said synthesizers to form a replica of the transmitted signal.

References Cited

UNITED STATES PATENTS

| | | |
|---|---|---|
| 3,057,960 | 10/1962 | Kaiser. |
| 3,109,066 | 10/1963 | David. |
| 3,360,610 | 12/1967 | Flanagan. |
| 3,183,304 | 5/1965 | Schroeder. |

KATHLEEN H. CLAFFY, *Primary Examiner.*
ROBERT P. TAYLOR, *Assistant Examiner.*